United States Patent
Yang et al.

(10) Patent No.: US 7,522,100 B2
(45) Date of Patent: Apr. 21, 2009

(54) METHOD AND DEVICE FOR ACQUIRING WEAK GLOBAL NAVIGATION SATELLITE SYSTEM (GNSS) SIGNALS

(75) Inventors: Chun Yang, Harleysville, PA (US); Hansheng Wang, San Jose, CA (US)

(73) Assignee: SiRF Technology Holdings, Inc., San Jose, CA (US)

( * ) Notice: Subject to any disclaimer, the term of this patent is extended or adjusted under 35 U.S.C. 154(b) by 112 days.

(21) Appl. No.: 11/173,894

(22) Filed: Jul. 1, 2005

(65) Prior Publication Data

US 2007/0008217 A1   Jan. 11, 2007

(51) Int. Cl.
*G01S 1/00* (2006.01)

(52) U.S. Cl. ................................. 342/357.12

(58) Field of Classification Search ............... 342/357.01–357.17
See application file for complete search history.

(56) References Cited

U.S. PATENT DOCUMENTS

| | | | |
|---|---|---|---|
| 5,271,034 A | 12/1993 | Abaunza | 375/1 |
| 5,884,214 A | 3/1999 | Krasner | 701/207 |
| 6,114,992 A | 9/2000 | Underbrink | 342/357.15 |
| 6,184,824 B1 | 2/2001 | Bode et al. | 342/357.15 |
| 6,298,083 B1 * | 10/2001 | Westcott et al. | 375/150 |
| 6,392,590 B1 | 5/2002 | Kagemoto | 342/357.06 |
| 6,407,699 B1 | 6/2002 | Yang | 342/357.12 |
| 6,459,405 B1 | 10/2002 | Da et al. | 342/357.09 |
| 6,611,756 B1 | 8/2003 | Chen et al. | 701/213 |
| 6,772,065 B2 | 8/2004 | Sanmiya et al. | 701/213 |
| 2002/0025011 A1 | 2/2002 | Sullivan | 375/343 |
| 2003/0187576 A1 | 10/2003 | Sanmiya et al. | 701/213 |
| 2005/0050293 A1 | 3/2005 | Falk et al. | 711/173 |
| 2006/0071851 A1 * | 4/2006 | Graas et al. | 342/357.14 |

* cited by examiner

*Primary Examiner*—Thomas H Tarcza
*Assistant Examiner*—Nga X Nguyen
(74) *Attorney, Agent, or Firm*—Pillsbury Winthrop Shaw Pittman LLP

(57) ABSTRACT

A Global Navigation Satellite System (GNSS) receiver and associated method capable of acquiring weak GNSS signals from a plurality of GNSS satellites produces a GNSS signal's code time, carrier frequency, and data bit transition parameters for subsequent signal tracking and position fixing. The GNSS receiver includes a baseband signal processor with special functionalities for acquiring weak signals. In a preferred embodiment, the time and frequency uncertainty space is reduced using available information and then special techniques are used to rapidly search the remaining uncertainty space. Successive reversal of short-length correlations within a data bit interval (a block) enables data bit transition detection and data bit sign correction prior to coherent integration. Fast Fourier Transform (FFT) is applied as a bank of bandpass filters to coherently accumulate blocks of short-length correlations over extended coherent integration intervals to boost the signal power while averaging noise out despite unknown data bit transitions.

20 Claims, 9 Drawing Sheets

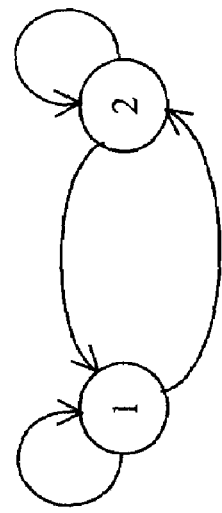
FIG. 5b
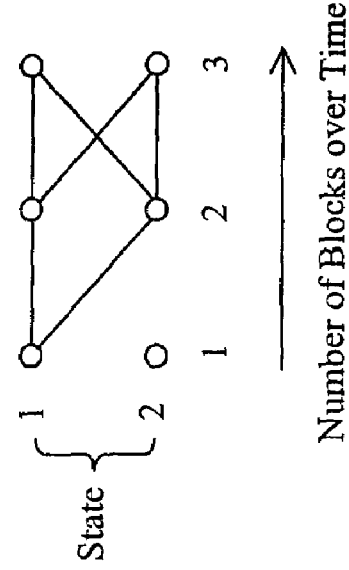
FIG. 5d
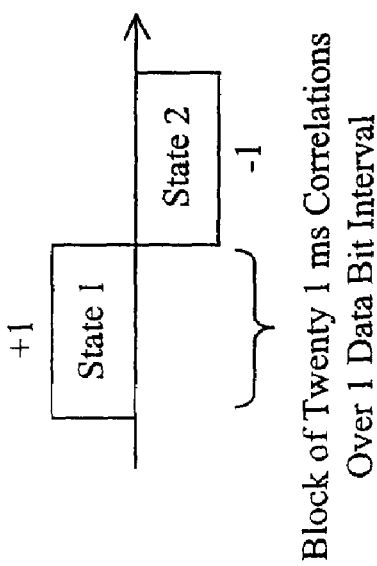
Block of Twenty 1 ms Correlations
Over 1 Data Bit Interval
FIG. 5a
Number of Blocks over Time
FIG. 5c

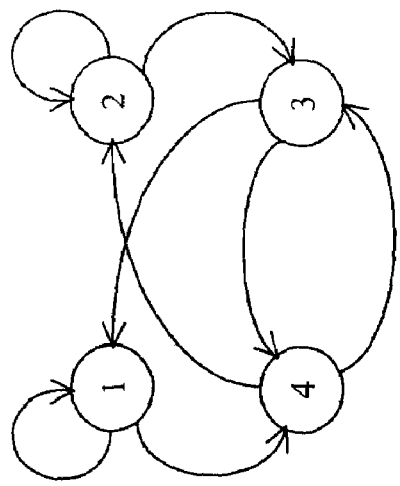
FIG. 6b
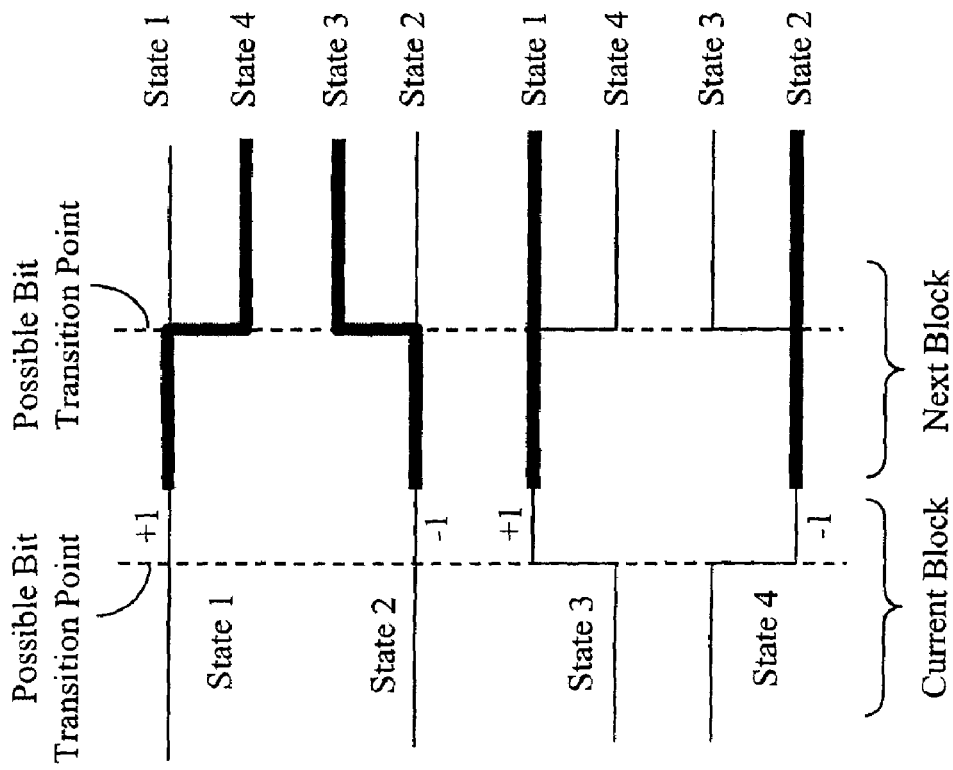
FIG. 6c
FIG. 6a

METHOD AND DEVICE FOR ACQUIRING WEAK GLOBAL NAVIGATION SATELLITE SYSTEM (GNSS) SIGNALS

FIELD OF THE INVENTION

The present invention relates generally to devices and methods for acquiring radio signals of very low power level and extracting time, frequency and other parameters therefrom. In particular, it relates to such devices and methods related to direct sequence spread spectrum (DS/SS) signals such as those used in the Global Navigation Satellite System (GNSS).

BACKGROUND OF THE INVENTION

The Global Navigation Satellite System (GNSS) under construction encompasses the U.S. Global Positioning System (GPS), the Russian Global Navigation Satellite System (GLONASS) and the future European GALILEO System. The GPS has a constellation of twenty four satellites that are in six different orbit plans around the earth. A navigation solution is obtained through measuring propagation delay times of the radio signals broadcast by the orbiting satellites to a GPS receiver. Normally, a receiver must acquire signals from at least four satellites in order to solve for the variables of longitude, latitude, altitude and time that are needed to precisely determine location. The received GPS signals must attain a minimum power level to ensure a GPS solution, which is routinely met when there is a clear line-of-sight (LOS) view from the receiver antenna to GPS satellites above the horizon.

Each GPS satellite transmits signals at several frequencies including 1575.42 MHz (referred to as L1), 1227.60 MHz (L2) and soon 1176.45 MHz (L5). Each carrier signal is phase-modulated with at least one pseudo random number (PRN) code, which is also known as the spectrum spreading code, and some signals are further modulated with a navigation data message that provides the precise satellite orbital, clock, and other information. Each spectrum-spreading code is unique for a satellite and is used as the identifier for that satellite. At the receiver, successful correlation between the incoming signal and a locally generated reference code identifies which GPS satellite signal is being received. This also removes the spectrum-spreading code and this despreading process increases the signal to noise ratio (SNR) and allows the navigation data bits to be demodulated. Decoding of PRN codes and navigation data bits provides the exact knowledge of the GPS satellite orbital position and the time at which the received signal was transmitted (a transmission time tag). Each GPS receiver has its own local clock used to mark the time at which the signal was received (a reception time tag). The difference between the two time tags is a measurement of the signal propagation time. The range to each satellite is then calculated by multiplying each delay by the speed of light. The location and time of the user are then found by solving known equations that incorporate the measured range (also called the pseudorange due to timing errors involved in the measurement) to the known location of several GPS satellites.

However, when the line-of-sight view between the receiver and a satellite is obstructed (e.g., due to foliage, mountains, buildings, or other structures) the GPS signal strength may be severely attenuated, leading to position fix with poor accuracy and even breakdown of tracking loops inside a regular receiver. It is therefore desired to improve GPS receiver sensitivity to operate on GPS signals of very low power level (also referred to as weak signals) to satisfy the requirements of location-based mobile e-commerce and emergency call location (E911).

To enable weak GPS signal acquisition, one known technique at the receiver end is to extend the signal integration time. Coherent integration is more gainful than the non-coherent counterpart. However, when the coherent integration interval extends beyond, say, 20 milliseconds, which is the duration of one data bit for GPS C/A-code, the sign reversal of navigation data bits becomes destructive if it occurs in the middle of a long coherent integration. As a result, an additional signal parameter, namely, the data bit transition, has to be searched in addition to the two usual parameters, code phase (time) and carrier frequency, beside the ID number of GPS satellites. This in fact constitutes a four dimensional search.

With nominally twenty-four active GPS satellites in orbit, the maximum number of visible satellites is about ten for a near-Earth receiver. For GPS C/A-code, the amount of search in time (code phase) is actually fixed. With a search step of a half code chip, there are 2046 steps needed to cover the entire code sequence of 1023 chips. Sequential stepping through all the 2046 code phases, use of 2046 correlators in parallel, or a combination of sequential and parallel techniques are among a host of approaches of different complexity for code search and acquisition.

However, the amount of search in frequency and in data bit transition increases as the coherent integration prolongs. This can be seen from Eq. (1) below:

$$\Delta f \leq \frac{1}{2} T_i \quad (1)$$

where $T_i$ is the desired coherent integration time interval and $\Delta f$ is the tolerable frequency error (thus the search step size) in order to keep the processing loss within an acceptable level. The frequency uncertainty for a stationary user (due to the relative motion between the user and a GPS satellite and the receiver local clock drift) is typically ±5 kHz. When the integration time is increased from the C/A-code epoch of 1 millisecond to, say, 20 milliseconds, the amount of frequency search needs to be increased by 20-fold according to Eq. (1). Similarly, the number of possible locations of data bit transition also increases proportionally as the coherent integration interval increases. There are also second-order effects associated with the extended coherent integration. This mainly involves changes in the carrier frequency and code chipping rate due to acceleration and instability of local clock, which may become significant over long integration intervals.

A typical search process is described below for a GPS receiver employing 1 millisecond correlation for the C/A-code using either sequential or parallel correlators. It involves search in four dimensions. The first search is to look for a visible GPS satellite among those active satellites in orbit. For a given satellite, parametric search is conducted in three nested loops. The outer parametric loop is typically the frequency search, which steps through the frequency uncertainty interval 500 Hz per step. The selected frequency offset (a frequency bin) is added to the nominal frequency to control the carrier numerically controlled oscillator (NCO) whose output drives the in-phase and quadrature components of the reference carrier for down-conversation to baseband.

The middle parametric loop is the code phase search over the entire code epoch of 1023 chips, a half chip per step (a code lag) typically. In a correlator-based receiver, the code phase search may be done sequentially one code phase at a time or in parallel with all code phases searched at the same time.

The inner loop accumulates the 1 millisecond correlations for each search grid point made of the frequency bin and code lag over a certain period of time (a dwell time), during which the signal is added up for detection. Under normal signal strength, the dwell time is usually chosen to be several milliseconds wherein the 1 millisecond correlations are power-combined (i.e., the non-coherent integration) with the navigation data bit transitions squared out, thus not being an issue. However, for weak GPS signals, the dwell time may extend beyond 20 milliseconds for coherent integration where the navigation data bit transition plays a critical role. It is the way in which coherent integration is carried out over an interval lasting multiple data bits that differentiates a weak signal acquisition (and tracking) scheme from that with normal signal strength.

For a search grid, the worst code uncertainty is a quarter of a chip duration ($\Delta t = T_c/4$) and the worst Doppler uncertainty is $\Delta f = 250$ Hz. As a result, the maximum loss in a 1 millisecond coherent integration ($T_i = 1$ millisecond) is $$\text{Loss} = 20\log_{10} R(\Delta t) + 20\log_{10}[\sin(\pi \Delta f T_i)/\pi \Delta f T_i] \qquad (2)$$
$$= 20\log_{10}(0.75) + 20\log_{10}(0.9) = -3.4 \text{ dB}$$

where $R(\cdot)$ stands for the correlation function with an ideally triangular shape.

For this worst search grid point, the correlator output is complex-valued. Since the spreading code is stripped off, the signal now contains a sine wave with its frequency being the residual Doppler up to 250 Hz that is bi-phase modulated by the unknown navigation data bit sequence at 50 Hz. However, the signal is too weak for the modulation to be visible at this point for it is deeply buried in noise.

To boost the SNR, coherent integration needs to last longer. When the despreading correlation is carried out every 1 millisecond, the complex correlation is available at the rate of 1 kHz. To further integrate, there will be twenty 1 millisecond correlations (20 data points) per a data bit. When coherent integration is beyond two data bits, the number of possible bit transitions is large and bit transition patterns become complicated.

There are, consequently, outstanding problems with known techniques for weak GPS signal acquisition and tracking in a standalone high-sensitivity receivers.

Another approach to acquiring weak GPS signals is assisted GPS (AGPS). The AGPS approach relies upon a wireless data link (or other means) to distribute, in real time, such information as time, frequency, navigation data bits, satellite ephemeredes, and approximate position as well as differential corrections to special GPS receivers equipped with a network modem so as to reduce the uncertainty search space, to help lock onto signals, and to assist navigation solution. This approach, however, comes with a heavy price associated with installing and maintaining the wireless aiding infrastructure and services required to provide the coverage.

A need therefore exists for weak GPS signal acquisition without network assistance. This need is met by the present invention as described and claimed below, which belongs to the category of approaches aimed at enhancing the sensitivity of standalone GPS receivers.

SUMMARY OF THE INVENTION

A Global Navigation Satellite System (GNSS) receiver and associated method capable of acquiring weak GNSS signals (i.e., of very low power level) from a plurality of GNSS satellites produces GNSS signal code time, carrier frequency, and data bit transition parameters for subsequent signal tracking and position fixing. The GNSS receiver includes an antenna and an analog front-end to intercept the incoming radio-frequency signal and to convert it to an appropriate intermediate frequency for digital sampling. A baseband signal processor is organized into functionally identical channels, each dynamically assigned to a different satellite in view, with processing results delivered to a data processor for obtaining a navigation solution. By processing the digital samples with a special functionality, the baseband signal processor is able to acquire weak signals. In one embodiment, the weak signal acquisition capable baseband signal processor first reduces the time and frequency uncertainty space using any useful information that can be obtained and then searches through the remaining uncertainty space in a rapid manner in accordance with three techniques of the invention. The first technique of successive sign reversal of short-length correlations (e.g., the 1 millisecond correlation for GPS C/A-codes) enables data bit transition detection and data bit sign correction within a data bit interval (a block). This is in sharp contrast to conventional methods that only process half blocks at a time (undesired SNR loss) or are stretched over two blocks (excessive latency). In addition, it allows for efficient use of Fast Fourier Transform (FFT), which only needs to be calculated once and manipulated simply for all tentative bit alignments.

As the second technique, the FFT is implemented as a bank of bandpass filters to integrate blocks of correlations in a coherent manner, as opposed to conventional phase rotation that can only handle one bandpass filter at a time and requires excessive frequency search. Finally, the third technique optimizes the overall computation by pruning unlikely branches of the search paths in partial sums. Such a block accumulating coherent integration boosts the signal power while reducing noise despite unknown data bit transitions and other variations that may occur during the extended coherent integration intervals.

BRIEF DESCRIPTION OF THE DRAWINGS

For a better understanding of the present invention, reference is made to the following description of an exemplary embodiment thereof, considered in conjunction with the accompanying drawings, in which:

FIGS. 5a, 5b, 5c, and 5d are graphic representations of data bit transition states for an aligned block in terms of a time diagram (FIG. 5a), a finite state machine (FIG. 5b), a trellis diagram (FIG. 5c), and a truth table (FIG. 5d), respectively, in accordance with the present invention;

FIGS. 6a, 6b, and 6c are graphic representations of data bit transition states for an unaligned block in terms of a time diagram (FIG. 6a), a finite state machine (FIG. 6b), and a truth table (FIG. 6c), respectively, in accordance with the present invention;

DETAILED DESCRIPTION

The present invention concerns the device and method for a GNSS receiver capable of acquiring weak satellite signals and extracting time, frequency and other parameters therefrom as an integral part of the receiver's baseband signal processor operations. Although the present invention system and method can be used for the acquisition of various signals used in the GNSS, the present invention system and method are particularly well suited for use with the acquisition of signals from GPS satellites. Accordingly, an exemplary embodiment of the present invention will be described in an application of acquiring weak signals from GPS satellites.

Figure 1:
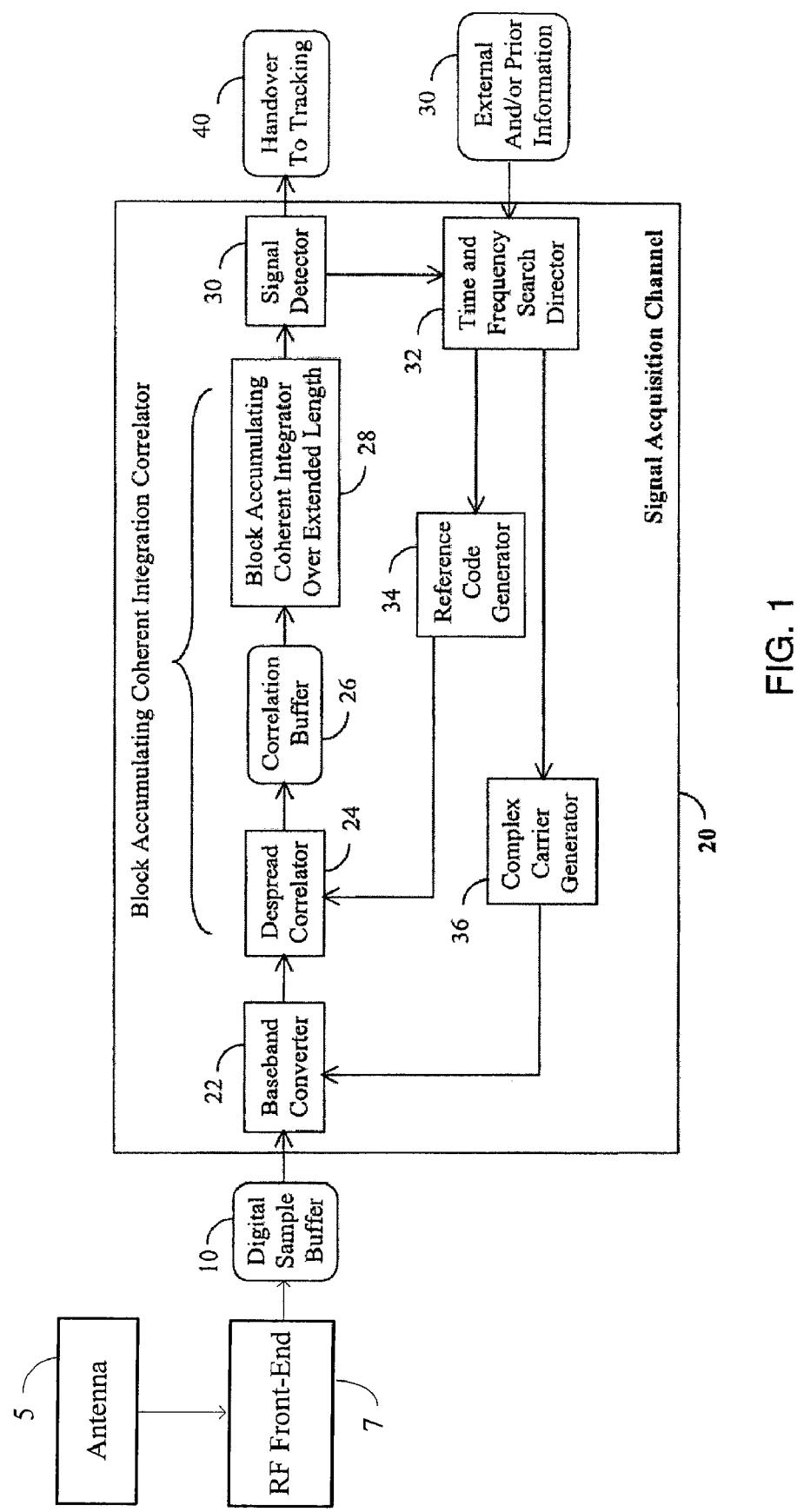
FIG. 1 is a schematic illustrating the major components of an exemplary channel for acquisition of signals of very low power level as a part of a GPS receiver's baseband signal processor in accordance with the present invention.

Referring to FIG. 1, an incoming GPS signal is received at a GPS receiver's RF front-end 7 where it is converted to a digital signal by an analog to digital converter (not shown) and then stored in a digital sample buffer 10. The digital sample buffer 10 can be connected to the RF front-end 7 directly or indirectly via a wireline or wireless data link for real-time computation or for off-line post-processing. The techniques for design and construction of GPS antennas 5, RF front-ends 7, and data link modems that possess the characteristics relevant to the present invention are well known to those of ordinary skill in the art.

As shown in FIG. 1, signal samples in the digital sample buffer 10 are processed within a signal acquisition channel processing block 20. A multiplicity of similar signal acquisition channel processing blocks may be configured to operate in parallel, each assigned to process signals from a specific GPS satellite. In an alternative embodiment, one signal acquisition channel processing block is used to sequentially process signals from multiple GPS satellites. In yet another embodiment, a number of signal acquisition channel processing blocks can be arranged in a sequential-parallel fashion to process signals from various GPS satellites. As an example of illustration, but not limitation, a single signal acquisition channel processing block is described in detail below.

Within each signal acquisition channel processing block 20, the digital signal samples pass through a baseband converter 22 and then to a despread correlator 24 with the resulting correlations held in a correlation buffer 26. The baseband converter 22 translates the center frequency of the incoming signal from an intermediate frequency (the nominal frequency plus unknown Doppler frequency and clock drift) to near baseband (zero frequency) by mixing it with a reference carrier produced by a complex carrier generator 36. Since the Doppler frequency is unknown, a time and frequency search director 32 divides the time and frequency uncertainty zone into a grid of search points and steps through in an orderly fashion. Prior information 38 is used to delimit the uncertainty zone and determine the step size. In addition, external aiding information 38, if available, is used to further reduce the uncertainty zone. There are many search strategies that can be adapted for the present invention and an exemplary approach is disclosed in U.S. patent application Ser. No. 11/123,861 filed May 6, 2005 entitled Efficient and Flexible GPS Receiver Baseband Architecture, by co-inventors of this invention, which is hereby incorporated by reference.

For each search grid point, the test frequency (called a frequency bin) is used by the complex carrier generator 36 to produce the reference carrier used in the baseband converter 22. At the same time, the test code phase (called a code lag) is used by the reference code generator 34 to produce a reference PRN code, which is used in turn in the despread correlator 24 to yield a correlation to be stored in the correlation buffer 26. The time spent at each search grid point is called the dwell time. Conventional receivers typically use a short dwell time on the order of 1 millisecond for coherent integration and several milliseconds for non-coherent integration so as to expedite the signal acquisition process. This choice works fine so long as the incoming signal is around the nominal strength. However, in weak signal cases, the dwell time somehow has to be extended to a rather much longer time interval over which the weak signal is accumulated in strength while the noise is averaged out. The short-length correlations stored in the correlation buffer 26 are processed in a block-accumulating coherent integrator over extended length 28, which will be discussed in more detail below.

The accumulated correlation over an extended length is then power-tested by a signal detector 30 to determine if a GPS signal of interest is present at the particular search grid point. If the correlation power is below a preset threshold, the search point director 32 moves the acquisition to another search grid point and repeats the whole process. If the correlation power is above the detection threshold, the signal is declared to be acquired and the signal detector 30 initiates the process for handover to tracking 40 with all relevant information associated with the search grid point.

In the exemplary schematic shown in FIG. 1, the baseband converter 22 is placed ahead of the despread correlator 24. In an alternative arrangement, the despread correlator 24 can be placed ahead of the baseband converter 22, in which case the integration interval of the despread correlator 24 is shortened so as to accommodate large Doppler frequency errors.

In both cases, either hardware correlators or software correlators can be used to implement the despreading integration. Although the block accumulating coherent integrator 28 is placed within search loops operating on search grid points sequentially, it can be used in conjunction with massive parallel hardware correlators or with a Fast Fourier Transform (FFT)-implemented correlation function. The details of a frequency-domain GPS receiver with FFT are disclosed in U.S. Pat. No. 6,407,699 B1 issued Jun. 18, 2002 to one of the present inventors, which is hereby incorporated by reference.

One major difficulty encountered in correlation over a long periods of time is the change of the sign of data bits in the middle of a correlation interval. Data bit sign change is also equivalently referred to as data bit transition or data bit sign reversal. Prior to data bit synchronization, correlation can be destroyed even with perfect code phase alignment if the data bit reverses its sign in the middle of an integration interval.

Figures 2A, 2B:
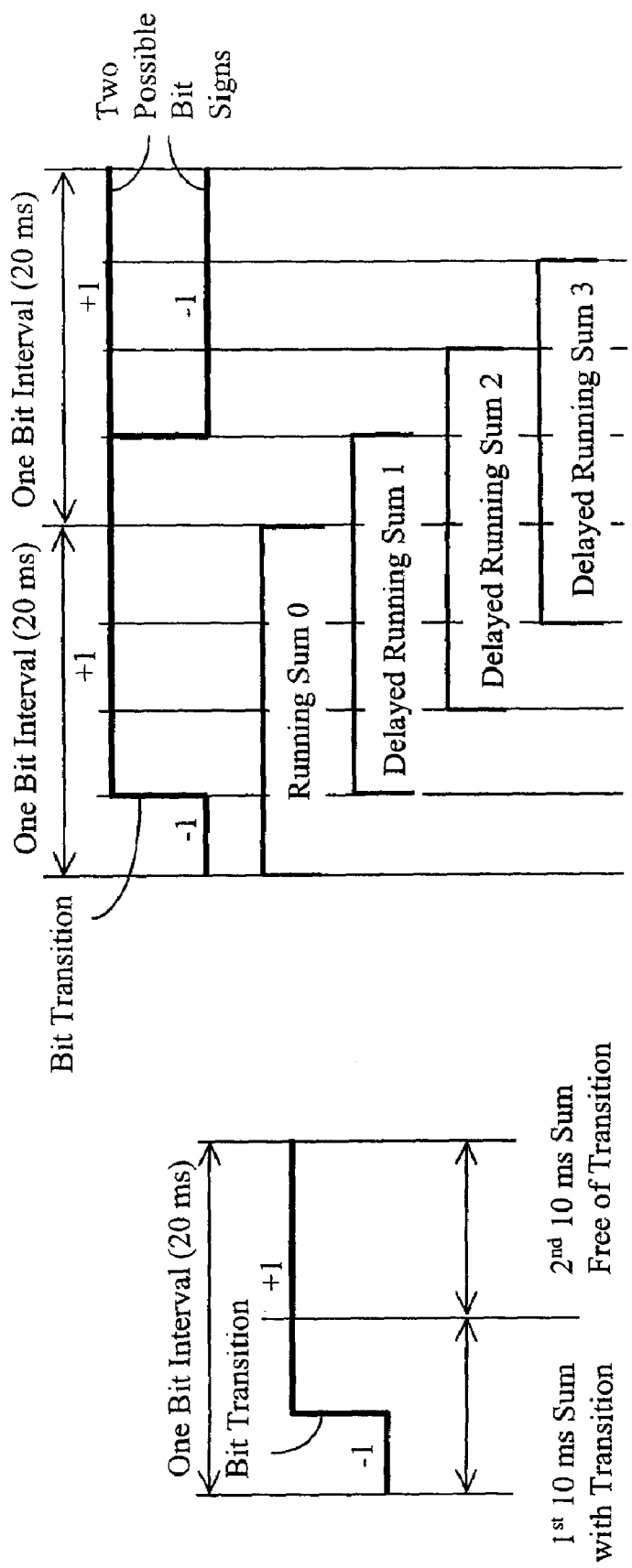
FIG. 2a is a graphic representation of a prior art technique that uses consecutive partial sums to detect data bit transition.
FIG. 2b is a graphic representation of a prior art technique that uses overlapped running sums to detect data bit transition.

Two prior art techniques widely used to deal with a possible data bit transition within a 20 millisecond coherent integration are illustrated in FIG. 2a and FIG. 2b, respectively. The first prior art technique, as shown in FIG. 2a, consists of running two consecutive 10 millisecond coherently integrated sums. If there is a data bit transition in the first 10 millisecond segment, the second 10 millisecond segment is guaranteed to be free of data bit transition, thus allowing for the 1 millisecond short-length correlations added up constructively.

The second prior art technique, as shown in FIG. 2b, consists of maintaining twenty running sums, each delayed by 1 millisecond relative to its predecessor, wherein only four running sums are depicted to simplify the illustration. These running sums actually extend over two data bit intervals. As shown, the samples in the first sample window of one data bit long fill the first sum and each new sample from the second sample window generates a new delayed sum. If there is a transition, the sum that aligns with the transition produces the maximum value. This prior art technique is useful when the residual frequency error is small. However, when the frequency error is large, it becomes less attractive unless the frequency error is compensated for by proper phase rotation.

Figure 2C:
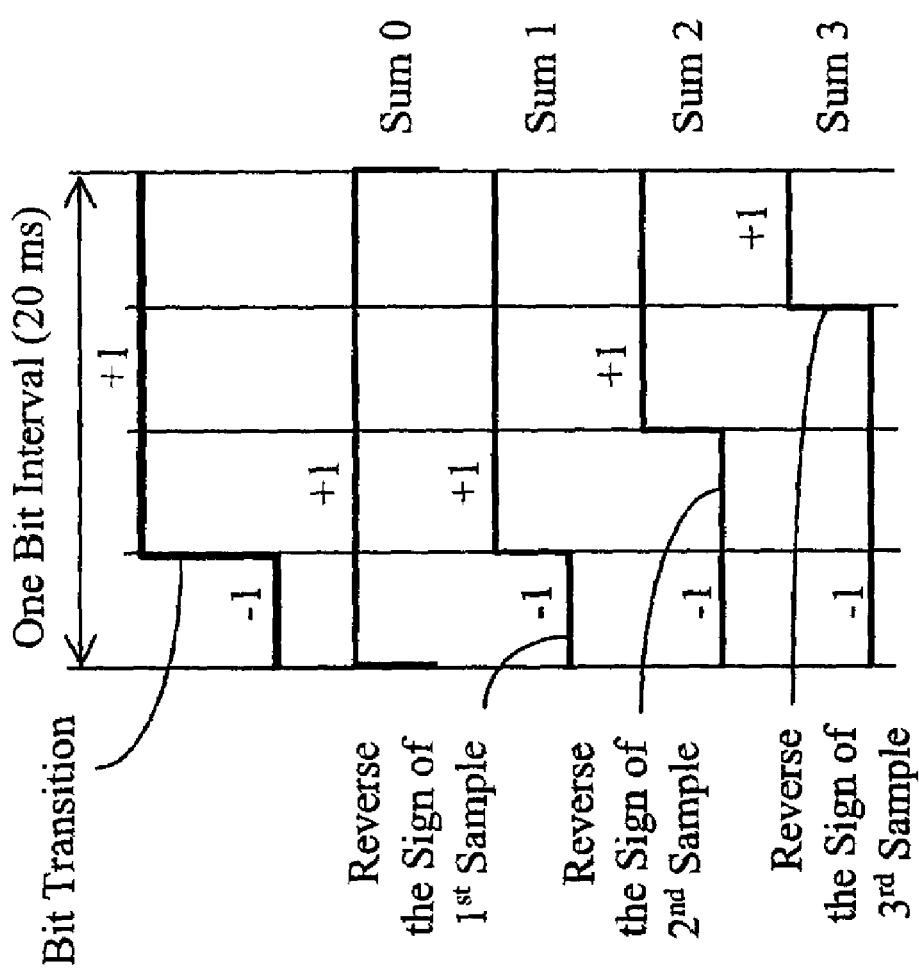
FIG. 2c is a graphic representation of the disclosed technique that successively reverses the sign of a sample point in the running sums to detect data bit transition in accordance with the present invention.

A novel technique used in one embodiment of the present invention is illustrated in FIG. 2c wherein twenty running sums are maintained but each sum successively reverses the sign of one sample of the previous sum. The matched reversal rectifies all samples to the same sign, thus producing the maximum value for the sum. In contrast to the technique using sliding sums over two data bits illustrated in FIG. 2b, this technique allows for the determination of a data bit transition, if any, over one data bit alone.

Another major difficulty faced by correlation over an extended period of time is the frequency error between the incoming signal and the reference carrier. In the following description, second-order effects will be omitted for simplicity and, consequently, the unknown signal frequency is assumed to be constant over any working interval. To satisfy the frequency error requirement of Eq. (1), a very fine frequency search step size may be imposed for a long coherent integration interval. This amounts to a large number of search steps. For example, if the residual frequency error is 250 Hz for the 1 millisecond correlation, a refined frequency search step of around 2 Hz for an extended coherent integration of 256 milliseconds may be used, corresponding to 128 steps.

A "brute force" approach would walk through the frequency uncertainty interval one step at a time. At each frequency step, the successive 1 millisecond complex correlation values would be phase-rotated to the desired baseband, followed by adding up twenty phase-rotated short-length correlations every 20 milliseconds, thus reducing the correlations over a data bit into one data point. However, twenty sums would be needed per frequency step, each corresponding to a possible location of data bit transition within the 20 millisecond interval. To go beyond 20 milliseconds, the sums of 20 millisecond-averaged data points would be power-combined over the entire extended integration interval. Tests would then be conducted to determine the most likely sequence of data bits. The maximum sum value among all search steps that is above a preset threshold would provide the best bit sync, bit sequence, and frequency step estimates. This prior art approach is shown as Option 1 in FIG. 3.

Figure 3:
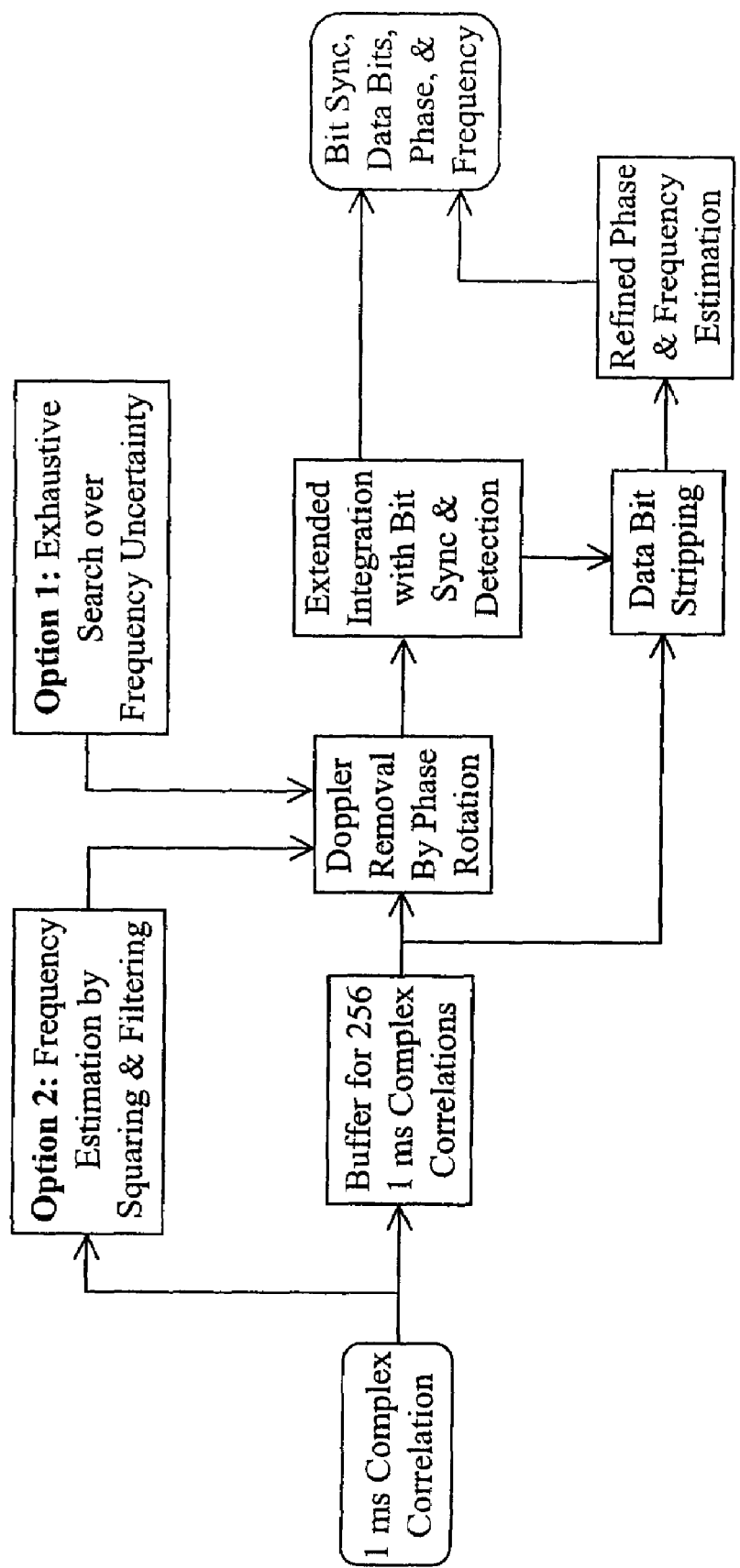
FIG. 3 is a schematic illustrating prior art method options for frequency estimation based on nonlinear techniques, exhaustive frequency search, phase rotation for residual Doppler removal, data bit detection and stripping, and refined frequency estimation.

Instead of stepping through the frequency uncertainty interval, a more efficient prior art technique is shown in FIG. 3 as Option 2. This prior art technique attempts to obtain a coarse estimate of the unknown frequency in the presence of data bits. One approach consists of first eliminating the binary phase modulation by squaring the signal samples and then uncovering the signal frequency by bandpass filtering. Squaring further degrades the SNR, which is already at a very low level, and this loss is expected to be compensated for in the subsequent coherent integration once the frequency is successfully estimated after squaring. With this technique, the extended signal samples are processed several times, thus requiring a substantial amount of memory to hold data during the processing. Another approach estimates the unknown frequency in the frequency domain by explicitly accounting for the spreading of 50 Hz navigation data across the frequency bins. The underlying frequency may also be estimated off board at a nearby base station with the frequency estimate sent over via a data link. Similarly, it can also be estimated from an independent source such as an inertial measurement unit (IMU) to expedite the frequency search process.

Figure 4:
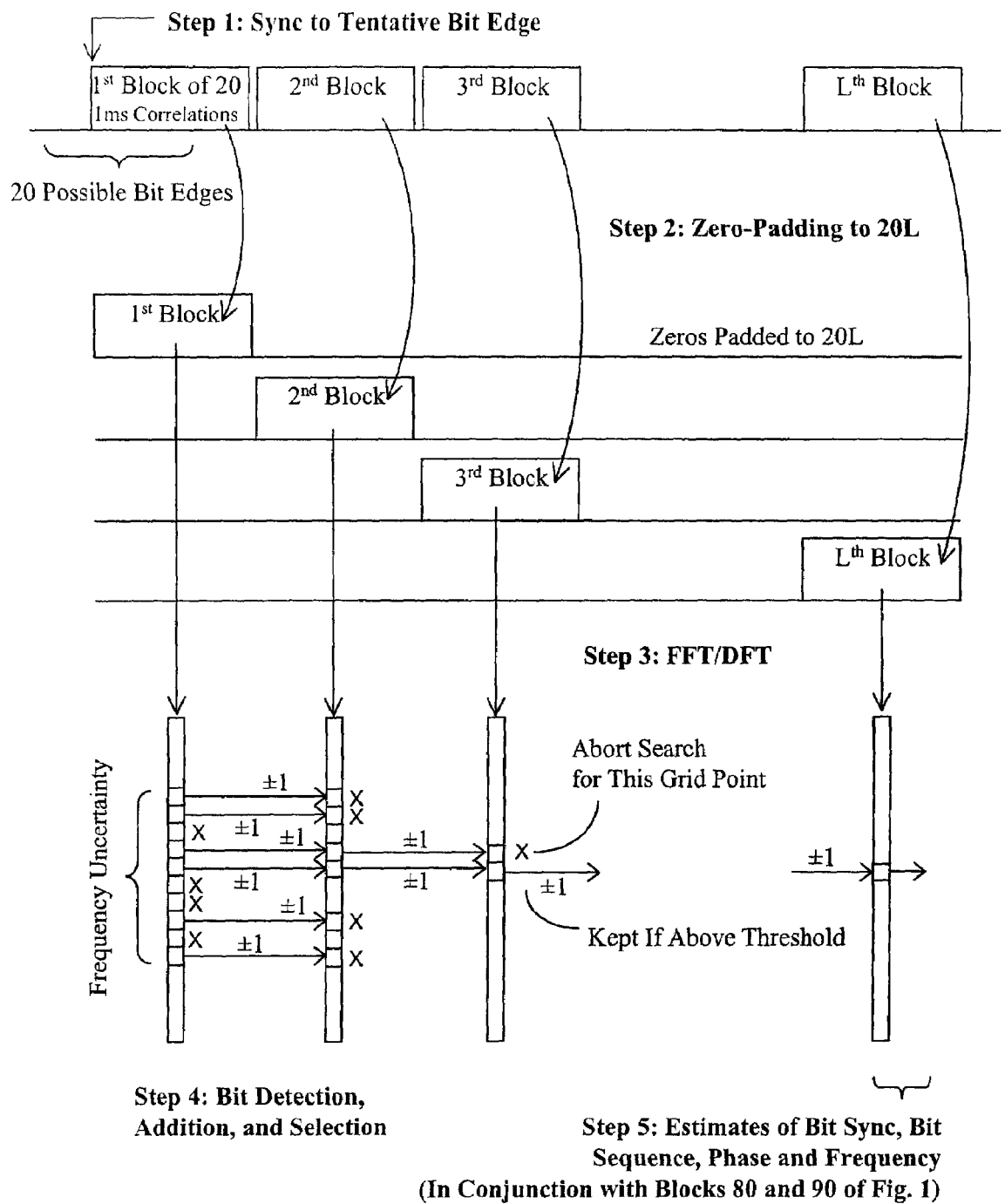
FIG. 4 is a graphic representation of major method steps of an exemplary embodiment of block accumulating coherent integration over extended length in accordance with the present invention.
Figure 7B:
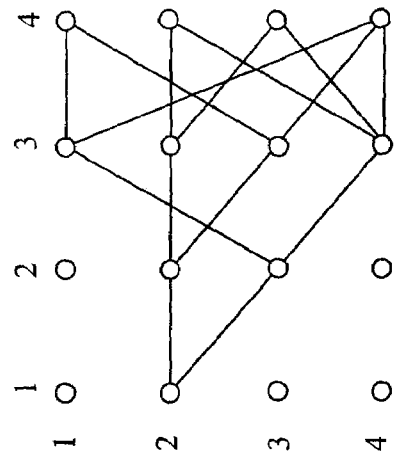
FIGS. 7a, 7b, 7c, and 7d are graphic representations of data bit transition states for an unaligned block in a trellis diagram with four possible initial states, respectively, in accordance with the present invention.
Figure 7D:
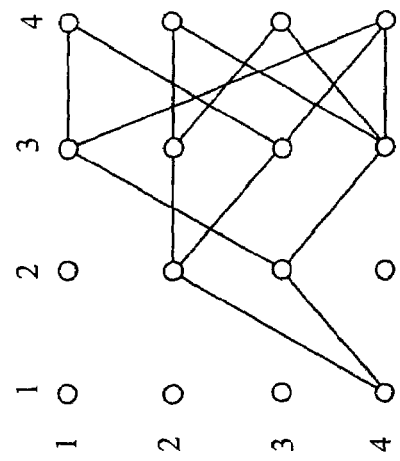
Figure 7A:
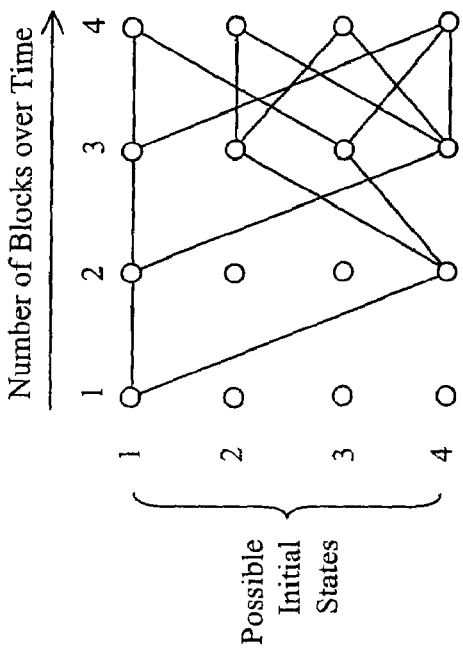
Figure 7C:
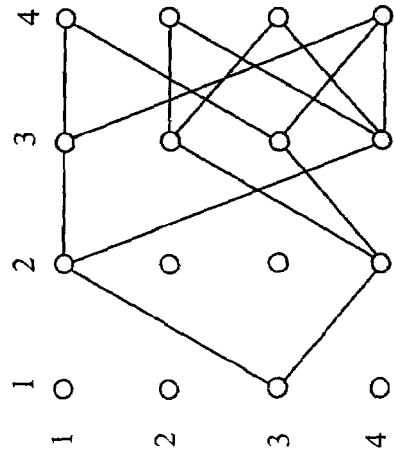

FIG. 4 illustrates the major steps of a block accumulating coherent integration technique in accordance with one embodiment of the present invention. A decision is made for every block to ascertain if a GPS signal of interest is present or not. The technique does not need to hold all signal samples in memory and can terminate the acquisition process as soon as the signal is detected without waiting until the very end of the full length. The incoming data samples are processed in blocks; each block is typically 20 milliseconds long and contains twenty 1 millisecond complex correlations over the length of 1 data bit. There are five major steps. The first step selects a data point (i.e., the start of a 1 millisecond short-length correlation) as the tentative bit edge (i.e., bit transition to reverse sign) and then groups the incoming data stream into successive blocks, each block with 20 data points and each data point being a 1 millisecond complex correlation, which is delivered by the despread correlator 24 into the correlation buffers 26 as illustrated in FIG. 1. Since there are 20 possible locations for a data bit to make transition over a data bit length, there are 20 possible bit edges to test. Twenty running sums are therefore created in this step, each in sync with a tentative bit edge. The following steps are applied to each running sum in an orderly fashion.

As shown in FIG. 4, the second step operates on a block-to-block basis. Assume that the desired extent of the coherent integration interval is L blocks of 20 data points. For each block, this step pads zeros around the data block to the desired length of 20L, which corresponds to a duration of 20L ms assuming each data point is 1 ms. Depending on the location in the sequence, a particular block may require pre-padding and/or post-padding of zeros as shown in FIG. 4 so as to keep the timing (phase) relationship among data points intact. Zero-padding can be used to make the number of data points equal to a power of two for efficient use of the FFT algorithm. More importantly, the resulting frequency resolution after zero padding becomes $\Delta f=1/20L$, thus satisfying the coherent integration requirement as specified in Eq. (1). In addition, it maintains coherency among successive blocks when they are accumulated consecutively.

The third step as shown in FIG. 4 applies a 20L-point FFT to the zero-padded blocks. An efficient implementation of the FFT can take advantage of the large amount of zeros by eliminating those stages of butterfly inside the FFT implementation that correspond to zero input. The resulting complex value at each frequency bin is equivalent to integrating the data points in the block after phase-rotation at this frequency bin (i.e., eliminating the residual Doppler frequency of this value). Although this step is computationally intensive, a number of techniques can be used to reduce the overall computational burden. In conjunction with pruning decisions made in subsequent steps, there may be no need to apply the full-length FFT but rather the discrete Fourier transform (DFT) for few selected frequency bins only. In one example, a 256-point FFT over 256 milliseconds results in 256 frequency bins with a frequency resolution about 4 Hz, covering the frequency range of 1 kHz (±500 Hz). If the residual frequency error is within ±250 Hz, the initial frequency uncertainty is covered with ±64 bins. The calculation of DFT for these bins requires about 64×2×20=2560 multiplications whereas the full length FFT requires about 256×log$_2$256=2048 multiplications. It is clear that when the number of frequency bins is reduced to less than 50 by pruning, the use of DFT starts to become computationally advantageous.

As shown in FIG. 4, the fourth step conducts two operations. The first operation attempts to detect the data bit sign for a tentative bit edge. In one approach, the complex value calculated with FFT on the current data block is added to the partial sum of the preceding blocks at the same selected frequency bin. Prior to the addition, the complex value is corrected with two possible signs (i.e., ±1) and the sign that results in a bigger sum is retained. Different decision criteria formulated for bit detection are presented later in this specification. In the second operation, a decision is made as to whether the signal of interest is present. In one approach, the updated partial sums for all selected frequency bins are tested against two predefined thresholds. The upper threshold confirms the acquisition of a GPS signal, and when successful it triggers the transition to tracking. The lower threshold is used to retain those partial sums that are above the threshold for further accumulation with the remaining data blocks and to abort search at those grid points with below-threshold partial sums before reaching the end. Additional criteria may be incorporated to eliminate the most unlikely frequency bins and/or data bit sequences.

In conjunction with the signal detector 30 of FIG. 1, if a signal is detected, the acquisition for the satellite is terminated by initializing tracking with the estimated bit sync, bit sequence, phase, and frequency as shown in the fifth step of FIG. 4. Otherwise, the search is declared unsuccessful, and the acquisition process continues at the next search grid point as coordinated by the time and frequency search director 32 of FIG. 4.

Referring to FIG. 4, the tentative bit transition is tested at each of the twenty possible positions in the first step. At a first glance, it might seem necessary to repeat the third step twenty times, each requiring the time-consuming FFT or DFT operations. However, when the bit transition is processed with the technique of the present invention as illustrated in FIG. 2c (i.e., successively reversing the sign of one sample at a time over a data bit), the FFT/DFT of a new bit transition sequence can be constructed from its predecessor with few simple additions, thus making it computationally viable.

Denote the samples in the m-th block by $$x_m = \{x_m[0], x_m[1], \ldots, x_m[19]\} = \{x_m[n]: n=0, \ldots, 19\}$$

where $x_m[n]$ is the n-th short-length correlation within the m-th block. The index for the n-th sample of the m-th block in the original data sequence is therefore given by 20(m−1)+n for m=1, ..., L. The same sequence with a bit transition at the δ-th sample for δ=0, ..., 19 is represented by $x_m^\delta = \{-x_m[0], \ldots, -x_m[\delta-1], x_m[\delta], \ldots, x_m[19]\}$ where the sign of the first δ samples is reversed.

Denote the DFT of $x_m$ by $X_m = DFT\{x_m\} = \{X_m[k]: k=0, \ldots, 20L-1\}$ where $$X_m[k] = \sum_{n=0,\ldots,19} x_m[n] \exp\{-j2\pi k[(m-1)^*20 + n]/20L\} \quad (3)$$

$$k = 0, 1, \ldots, 20L-1; m = 1, \ldots, L$$

It is easy to show that the DFT of $x_m^{\delta+1}$ is related to that of $x_m^\delta$ by:

$$X_m^{\delta+1}[k] = X_m^\delta[k] - 2x_m[\delta] \exp\{-j2\pi k/20(m-1)+d]/20L\} \delta=0, \ldots, 19; k=0, \ldots, 20L-1; m=1, \ldots, L \quad (4)$$

The first term on the right hand side of Eq. (4) has been evaluated in $X_m^0[k] = X_m[k]$. If saved in memory, it can be recalled for re-use. As a result, additions alone are sufficient to obtain the FFT/DFT for the 19 possible sequences in bit alignment search. Furthermore, only those k's that have been retained by previous partial sums need to be evaluated.

The block-accumulating coherent integration technique in accordance with the present invention utilizes the successive sign reversal method to rectify different data bit signs as illustrated in FIG. 2c in contrast to the prior art parallel sliding sum method and half-length sum method as shown in FIGS. 2b and 2a, respectively. With the present technique, each data block has 20 milliseconds worth of samples (i.e., 20 data points), each being the 1 millisecond complex correlation. When the tentative bit edge is set at the very first data point of the block, the data bit transition is thus assumed to coincide with this 20 millisecond block. For this aligned block, there are only two sign possibilities, either positive or negative. FIGS. 5a, 5b and 5c show the time diagram, state machine diagram, and trellis diagram, respectively, for the situation with aligned blocks. The truth table for this case is shown in FIG. 5d.

However, when the tentative bit edge is set at one of the remaining 19 data points of the block, the data bit transition does not coincide with a 20 millisecond data block but occurs somewhere within the block, thus having 19 possible positions (from the 2nd to 20th data points). Furthermore, the bit transition may not take place (not visible) in unaligned blocks if two consecutive bits are of the same sign. As a result, an unaligned block faces four possibilities. The first two correspond to no bit transition while the other two represent one bit transition, as illustrated in the time diagram of FIG. 6a. The four states are defined as (1) State 1: All positive; (2) State 2: All negative; (3) State 3: Transition from negative to positive; and (4) State 4: Transition from positive to negative.

According to this definition and from the time diagram of FIG. 6a, there are two branches into and out of a state, which is better illustrated by the state machine diagram of FIG. 6b with the truth table listed in FIG. 6c. From the state machine diagram in FIG. 6b and the truth table in FIG. 6c, it is easy to verify that State 1 and State 3 share the same transition patterns; so do State 2 and State 4. Furthermore, State 2 is the same as State 1 except for a sign difference. So is State 4, which is the same as State 3 except for a sign difference. Therefore, only a two-state machine, rather than a four-state machine, is needed to represent bit transitions, thus saving about a half of the memory and computation. The sign ambiguity associated with the two-state machine is of no consequence so long as the sign is taken consistent throughout the extended interval.

The trellis diagrams for a four state transition with the initial state being State 1, State 2, State 3, and State 4 are shown in FIGS. 7a, 7b, 7c, and 7d, respectively. After two blocks, possible transitions populate all the states, from which point on a decision is made every step to select the most likely path that has arrived at the current state.

When bit transitions are modeled by a trellis diagram as shown in FIG. 5c or FIG. 7, the selection of a best sequence is cast into the classic problem of a traveling salesman trying to find the shortest path between two cities. Two popular solutions exist. One is the forward dynamic programming, simply known as dynamic programming, and the other is the reverse dynamic programming, best known as the Viterbi algorithm. The dynamic programming technique finds the solution in a backward-search forward-evaluation (to the end) fashion typically used in optimal control, whereas the Viterbi algorithm finds the solution in a forward-search backward evaluation (from the start) manner widely used in sequence estimation as in the present invention's formulation. Both are based on the Bellman principle of optimality.

Compared to conventional state machines or trellis diagrams used in Viterbi algorithm implementation, the data bit detection for weak signals, however, lacks the values assigned to transition branches as costs or weights. In a typical implementation of the Viterbi algorithm for sequence estimation, the squared error between the observation value and the value assigned to each transition branch provides a cost for that transition. The sequence of states that offers the minimum cost is considered to be the most likely one.

Some prior art techniques use the expected signal levels as the assigned values to transition branches and as such, the Viterbi algorithm can be applied directly in a conventional manner. Once the data bit sequence is derived from the Viterbi algorithm, the final signal level is obtained as a part of the residual frequency and phase estimation process. However, how to select the expected signal levels is a difficult problem that may make the prior art algorithms highly sensitive to initialization errors. In addition, some prior art techniques use sequential frequency search and phase-rotation to deal with large frequency errors for coherency between blocks, which is computationally too demanding.

Since it is difficult, if not impossible, to predict signal levels under weak conditions with large uncertainties, instead of using the minimum cost seeking scheme as in prior art techniques with the conventional Viterbi algorithm, the present invention sets forth the maximum performance index finding scheme where the performance index is defined as the block-accumulated correlations. In one embodiment, after processing each new block of data (call it a stage), four possible states are updated; and each updated state retains a surviving path ended at this state (accompanied with a sequence of estimated data bit signs). In an alternative embodiment, only two states are updated because there are only two possible bit transitions for the second block given the data bit in the first block. The use of this conditional bit transition constraint can reduce the amount of computations by half.

For all paths leading to a state at the present stage, only the path that produces the largest performance index up to this stage is kept while all others are pruned off. This is because no matter what happens hereafter, the largest performance index path at this stage remains to be the largest for the rest of stages.

Conventional Viterbi algorithms preserve the paths for all states over a data window of finite length. When the data path length grows to the window length, the state with the lowest cost (or the highest performance index) is selected. The path leading to this best state is back tracked and the first state or branch in the window is taken as the output. At the next stage, the window slides over by one data point and all the paths are extended with the new data point. Then all paths are evaluated, the best path is selected, and a single output is produced. The process repeats.

However, this sliding output of the initial state per window length is not appropriate for the weak signal acquisition case because a decision has to be made within an extended integration interval (a data window of 256 milliseconds for instance) and there is no luxury to perform a sliding operation at each search grid unless the decision interval of 256 milliseconds is divided into smaller test intervals. One example is to have a window length of 4 blocks (or 80 milliseconds). However, maintaining a window length longer than 1 block requires additional memory and computation to keep track of possible paths from stage to stage for all states. This may not yield a proportional performance improvement.

A preferred embodiment in accordance with the present invention (1) adopts the maximum performance index (i.e., summed correlations) as the optimization criterion in contrast to the prior art minimum cost function, (2) implements a two-state machine with State 1/State 3 and State 2/State 4, thus reducing the memory and computation by half, and (3) makes a decision every stage by keeping only one state that possesses a surviving path with the maximum performance index among all states. The latter is equivalent to having a unity window length in the conventional Viterbi algorithm parlance.

Referring back to FIG. 4, the fourth and fifth steps may be skipped altogether for some bit alignment sequences if their partial sums stay below a threshold (i.e., to exclude those bit transitions at unlikely d's). As the coherent integration continues, the minimum SNR level as expected from the data blocks already integrated may be used to set up the thresholds for subsequent detection. As the pruning progressively trims down the number of search paths when integrated into more and more blocks, the overall computation load is therefore maintained, thus making the technique fast and efficient.

Referring to FIG. 4, in the fourth step, for each tentative bit alignment, the sign of data bit for a block can be found such that it maximizes the partial sum across all the frequency bins:

$$\underline{b} = \arg\max_{b=\pm 1}\{|\text{Sum } fb[k] + b^* fb[k]|: \text{ for all } k\} \quad (5)$$

where fb[·] stands for the FFT of the current block, Sum fb[·] is the accumulated FFT up to the previous block (partial sum), k is the index of frequency bin, |·| stands for the magnitude of the enclosed complex vector, and $\underline{b}$ is the best estimate of the data bit sign b for the current block.

Instead of determining a data bit sign for all frequency bins, an alternative approach applies the decision rule on individual frequency bins:

$$\underline{b}_k = \arg\max_{b_k=\pm 1}\{|\text{Sum } fb[k] + b_k^* fb[k]|: \text{ for each } k\} \quad (6)$$

where $\underline{b}_k$ is the best estimate of the data bit sign $b_k$ for the current block at the frequency bin k. Working on each and every frequency bin, the alternative approach needs more memory to keep track of all the data bit sequences but offers better performance at the cost of more computation.

Figure 8:
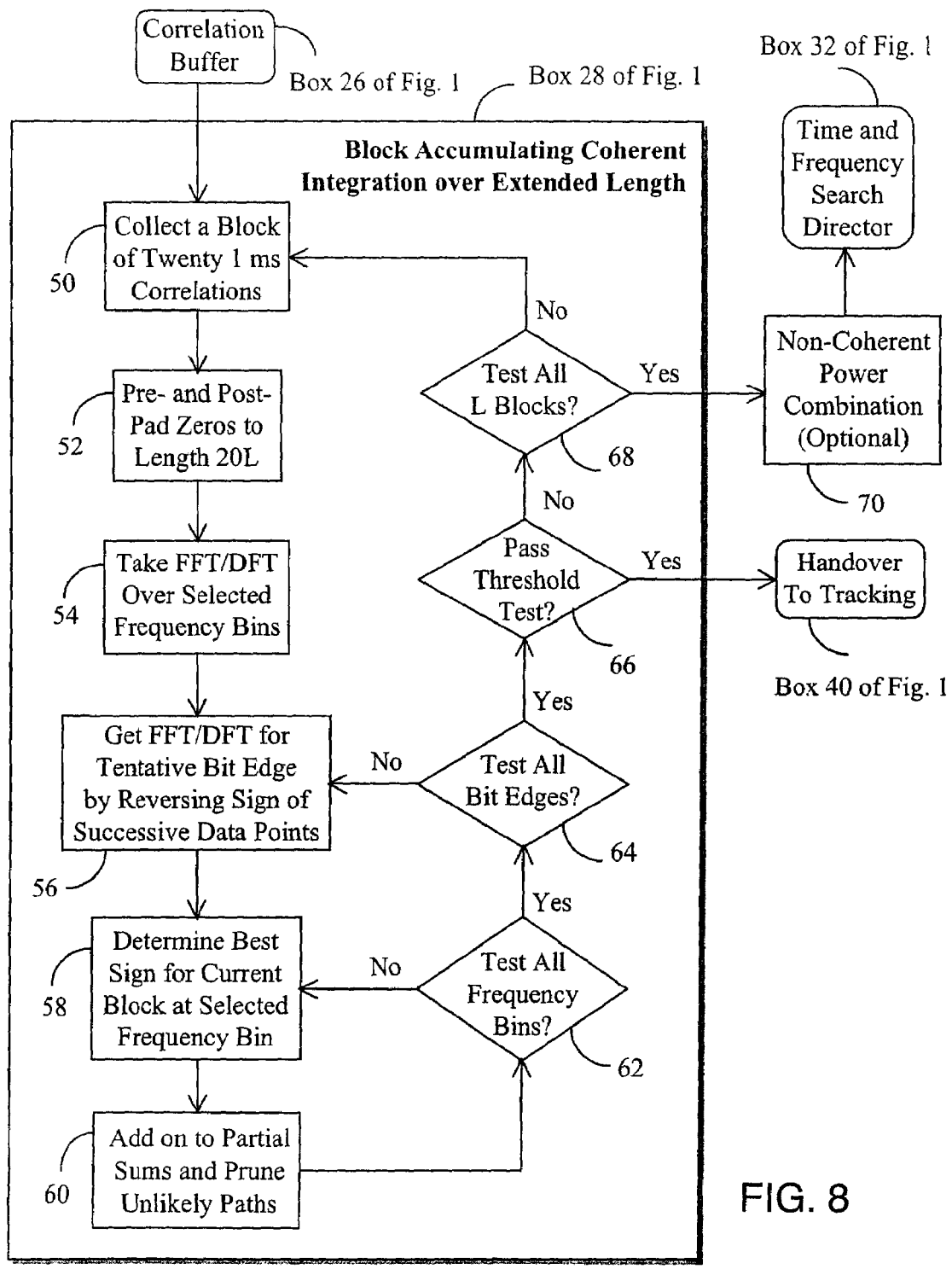
FIG. 8 is a flow chart of major method steps of an exemplary embodiment of block accumulating coherent integration over extended length in accordance with the present invention.

FIG. 8 shows a flow chart which captures the five major steps illustrated in FIG. 4 of a block accumulating coherent integration technique in accordance with an embodiment of the present invention. A block of twenty consecutively 1 millisecond correlations is collected at step 50 from the correlation buffer 26 of FIG. 1. Successive blocks of twenty correlations are so collected and delivered for processing at the next step.

At step 52, each block of twenty data points is pre-padded and/or post-padded with blocks of zeros to the length of 20L where L is the number of blocks for the desired length of extended coherent integration. Zero-padding is done in such a way that the relative timing of a block in the original sequence is preserved over the entire extended length.

Next at step 54, a 20L-point FFT is taken over the zero-padded block of 20L data points. Alternatively, a DFT can be calculated for those frequency bins that have survived the pruning process applied to the preceding blocks if the computation of the DFT at the selected frequency bins is less demanding than that of a full-blown FFT.

By assuming that the bit transition coincides with the first data sample in the block, the first tentative bit edge placement deals with an aligned block. As such, the FFT or DFT calculated at step 54 can be used directly. However, any of the remaining nineteen tentative bit edge placements has to handle an unaligned block. At step 56, the FFT or DFT for a new bit edge placement is calculated from that of the preceding placement by reversing the sign of successive data points, one for each bit edge recursively. Step 56 is repeated for all twenty possible bit edges, as shown by the decision box at step 64.

Next at step 58, the best data bit sign for the current block at a given tentative data bit edge is determined for selected frequency bins. For unaligned blocks, the possible bit transitions are constrained by the state of the previous block. The use of conditional bit transitions thus reduces the amount of computation and memory otherwise required. To the partial sum accumulated over the preceding blocks is added the complex correlation of the current block with its sign corrected for possible conditional bit transitions. Only the largest one is kept with the corresponding sign as the most likely one while the others are discarded. Step 58 is repeated for all selected frequency bins, as shown by the decision box at step 62.

The pruning operation may be withheld during the initial accumulation at step 60. After few blocks, the most likely path is kept while the unlikely ones are pruned off to keep the overall computation within a manageable size.

At step 66, the updated partial sums are compared to a preset threshold. If a partial sum exceeds the detection threshold, the signal is declared "detected" or "acquired" and the signal parameters associated with the partial sum are passed on for handover to tracking 40. The signal parameters include the coarse time and frequency values at the search grid point, the most likely bit edge within a block, and the sequence of data bits. Since the threshold test at step 66 is done every block, the signal acquisition process may be terminated whenever a signal is detected without the need to wait until the very end of an extended interval. Without any partial sum exceeding the threshold, the process moves on to the next block, as shown by the decision box at step 68. If there is still no detection when the end of a desired extended coherent interval is reached, the whole process is moved to an option step of non-coherent power combination 70. The non-coherent integration may be carried out over several coherent integration intervals. If there is still no detection, the whole process is moved to the next search grid point by the time and frequency search director 32.

Although the above description contains much specificity, these should not be construed as limiting the scope of the invention but as merely providing illustrations of some of the presently preferred embodiments of this invention. For example, the present invention provides a generic signal processing architecture of versatility wherein many processing blocks can be tailored to achieve a desired combination of functionalities.

Reference has been made mostly to the GPS signals with the C/A-codes but the techniques of present invention are equally applicable to the Russian GLONASS and European GALILEO signals, ground and space-based augmentation signals, and other components of the GNSS in general. Similarly, the techniques of the present invention are disclosed in connection with correlator-based GPS receivers but it can work equally well with matched filter-based receivers. If the matched filters are used to operate on the full C/A-code epoch of 1 millisecond, the receiver architecture is similar to that of the correlator-based receiver disclosed above. However, techniques of the present invention can be used in different receiver architectures. As an example, when subinterval correlation is supported for despreading integration with either a correlator or a matched filter, code stripping can be placed ahead of carrier down-conversion. In addition, the integration can be done sequentially one code phase at a time or in parallel for all possible code phases at the same time. Placing time search in the outer loop may render the pre-correlation frequency search unnecessary if the subinterval is judiciously chosen. If the maximum frequency uncertainty due to Doppler and clock drift is about ±10 kHz, the conventional full integration over 1 millisecond requires the frequency error to be within 500 Hz, dictating 20 frequency search steps in each direction. However, if the subinterval integration is set at 0.05 milliseconds (the equivalent bandwidth is 20 kHz), there is no need to perform frequency search prior to integration because this subinterval integration can tolerate the maximum frequency error of ±10 kHz. This leads to twenty 0.05 millisecond subintervals per a C/A-code epoch of 1 millisecond, 400 data points per data bit interval of 20 milliseconds. If the reference code is aligned within a half chip to the underlying signal, the subinterval correlation output is effectively sampled at the rate of 20 kHz, a real-valued sine wave. This sine wave has an unknown frequency up to 10 kHz and is bi-phase modulated by an unknown sequence of 50 Hz navigation data bits. The disclosed techniques of the present invention can be applied at this point to perform the extended coherent integration directly except with more data points per block.

It is understood that the figures and associated description above illustrate only the preferred embodiments of the present invention system and method. A person skilled in the art can therefore make numerous alterations and modifications to the described embodiments utilizing functionally equivalent components and method steps to those shown and described. All such modifications are intended to be included within the scope of the present invention as defined by the appended claims.

The invention claimed is:

1. In a navigational system utilizing a plurality of satellites that transmit radio-frequency signals containing time and orbit information of said satellites, a method of acquiring said satellite signals at a receiver, the method comprising:
   receiving a satellite signal at the receiver;
   performing short-length correlations between the received satellite signal and locally generated reference codes, wherein each short-length correlation spans approximately 1 ms;
   performing block accumulating coherent integration of said short-length correlations over a preset extended length, wherein performing the block accumulating coherent integration includes:
   reducing frequency error for a block of short-length correlations prior to
   integrating said block with preceding blocks over said preset extended length;

adding said frequency error reduced block of short-length correlations to partial sums of previous blocks of short-length correlations, thereby updating said partial sums, wherein each partial sum is added for a different possible data bit edge and a corrected bit sign of said block; and making a decision based upon said updated partial sums to ascertain the presence or absence of said satellite signal up to this point.

2. The method according to claim 1, wherein making decisions to ascertain the presence or absence of a satellite signal of interest includes:

if said block accumulating coherent integration is above a preset detection threshold, then terminating a signal acquisition process for said satellite signal of interest and handing processor control over to a tracking process; and if said block accumulating coherent integration is below said detection threshold, then determining a new time and frequency search grid point to continue said signal acquisition process for said satellite.

3. The method according to claim 1, wherein determining said new time and frequency search grid point includes:

determining a time and frequency uncertainty zone according to external and/or prior information;

dividing said time and frequency uncertainty zone into search grid points; stepping through said search grid points according to a preset search strategy; and generating a reference carrier and a reference code at a time and frequency search grid point selected from said search grid points.

4. The method according to claim 1, wherein performing said short-length correlation includes:

obtaining digital samples of said received satellite signals from a digital sample buffer;

down-converting said digital samples of said satellite signals to baseband using said reference carrier at said search grid point in terms of frequency bins;

selecting a length for said short-length correlation commensurate with said frequency bin at said search grid point to minimize processing loss due to frequency error;

despreading said down-converted digital samples of said satellite signals using said reference code at said search grid point in terms of code lags, thereby generating said short-length correlation between said satellite signals and said reference codes; and outputting said short-length correlation into a correlation buffer.

5. The method according to claim 1, wherein said step of reducing frequency error includes:

collecting successive blocks of consecutive short-length correlations from said correlation buffer;

padding zeros in front of and/or behind each of said blocks of short-length correlations to said desired extended length; and taking a Fourier transform of said zero-padded block of short-length correlations, where the Fourier transform is taken at selected frequency bins in the case of a discrete Fourier transform.

6. The method according to claim 5, wherein said step of padding zeros in front of and/or behind each and every of said blocks of short-length correlations to said extended length is done in such a manner that the relative timing of any of said blocks in the original sequence is preserved over said extended length.

7. The method according to claim 1, wherein said step of adding said frequency error reduced block includes:

obtaining a block of short-length correlations for each tentative data bit transition position;

correcting the sign of said block of short-length correlations for each said data bit transition position; and updating partial sums that have been accumulated over preceding blocks with said sign-corrected block of short-length correlations for each said data bit transition position.

8. The method according to claim 7, wherein said step of obtaining a block of short-length correlations for each of said tentative data bit transition position includes:

stepping possible data bit transition positions within said block by successively reversing one short-length correlation at a time; and for each said data bit transition position, adding a sign-reversing term corresponding to the current tentative bit transition position to the block of preceding bit transition position, thereby obtaining the block for the current tentative bit transition position.

9. The method according to claim 7, wherein said step of correcting the sign of said block of short-length correlations for each said data bit transition position includes:

determining possible bit signs for said block conditioned upon the sign of a preceding block for said data bit transition position; and generating sign-corrected blocks of short-length correlations for said possible bit signs.

10. The method according to claim 7, wherein said step of updating said partial sums includes:

adding said sign-corrected block of short-length correlations for said data bit transition position to a corresponding partial sum accumulated over preceding blocks;

repeating said updating at all frequency bins for a given bit transition position; and repeating said updating for all of said bit transition positions.

11. The method according to claim 1, wherein said step of making decision based upon said updated partial sums includes:

testing said updated partial sums against preset thresholds; and if any of said partial sums exceeds said preset threshold, terminating a signal acquisition process and declaring said signal of interest be acquired; and if none of said partial sums exceeds said preset threshold, repeating said testing until the end of said extended interval.

12. The method according to claim 11, wherein said step of terminating signal acquisition process includes handing over acquired signal parameters to tracking.

13. The method according to claim 11, wherein repeating said testing includes performing non-coherent power combination over several coherent integration intervals.

14. The method according to claim 11, wherein repeating said testing includes invoking a time and frequency search director so as to move said signal acquisition process to a new search grid point.

15. A receiver including:

an antenna capable of coupling to signals transmitted from a plurality of satellites of the Global Navigation Satellite System;

a radio frequency front-end that receives said signals from said satellites via said antenna, wherein said radio frequency front-end comprises a bandpass filter, power amplifier, and frequency down-converter;

a baseband signal processor comprising signal acquisition and tracking circuitry containing a plurality of functionally identical channels for extracting navigation data bits and other time and frequency parameters from said signals using said functionally identical channels; and a data processor for calculating a navigation solution from said extracted navigation data bits and other time and frequency parameters;

wherein the baseband signal processor dynamically assigns said signals to the functionally identical channels such that distinct signals are assigned to distinct channels, and wherein each of the functionally identical channels performs weak signal acquisition using a block-accumulating coherent integrator for coherently adding successive blocks of consecutive short-length correlations over a desired extended length for different possible tentative data bit transitions with tentative bit transition and sequence of data bits dynamically estimated, wherein each short-length correlation spans approximately 1 ms.

16. The receiver according to claim 15, wherein said baseband signal processor is physically separated from said radio frequency front-end and connected via a data link.

17. The receiver according to claim 15, wherein said baseband signal processor is physically connected to said radio frequency front-end as an integral part of the receiver.

18. The receiver according to claim 15, wherein each of said separate functionally identical channels includes: a signal acquisition processor; and a signal tracking processor that determines navigation data bits embedded in said satellite signal and extracts code time and carrier frequency parameters.

19. The receiver according to claim 18, wherein said signal acquisition processor includes:

a baseband converter for converting intermediate frequency signal samples from an input digital sample buffer down to baseband using a reference carrier;

a despread correlator for stripping off spectrum-spreading codes from said signal samples using a reference code and integrating over a short-length into an output correlation buffer;

said block-accumulating coherent integrator;

a signal detector for handing over the time and frequency parameters of a detected signal to tracking;

a time and frequency search director for delimiting the time and frequency uncertainty zone for fast and efficient search using prior and/or external information; and a reference code generator and a reference carrier generator producing said reference code and reference carrier at a time and frequency search point, respectively.

20. The receiver according to claim 19, wherein said signal detector is preceded by a non-coherent power combiner following the output from said block-accumulating coherent integrator.

* * * * *